United States Patent [19]
Melzer et al.

[11] Patent Number: 6,019,268
[45] Date of Patent: *Feb. 1, 2000

[54] METHOD FOR FABRICATING PLASTIC CARDS

[75] Inventors: Rainer Melzer; Roland Melzer, both of Schwelm, Germany

[73] Assignee: Melzer Maschinebau GmbH, Schwelm, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/586,945

[22] Filed: Jan. 16, 1996

[30] Foreign Application Priority Data

Jan. 13, 1995 [DE] Germany ............... 195 00 820

[51] Int. Cl.$^7$ ............... G03B 1/22; B65H 23/04
[52] U.S. Cl. ............... 226/35; 226/56; 226/57; 226/58; 226/162
[58] Field of Search ............... 156/229, 252, 156/494, 495; 264/156, 153, 160, 288.4; 226/35, 55, 56, 57, 58, 39, 149, 150, 162

[56] References Cited

U.S. PATENT DOCUMENTS

| | | |
|---|---|---|
| 3,410,466 | 11/1968 | Harris et al. . |
| 4,863,546 | 9/1989 | Melzer et al. . |
| 5,015,312 | 5/1991 | Kinzie ............... 156/252 |
| 5,443,679 | 8/1995 | Nishimura et al. ............... 156/495 |
| 5,474,636 | 12/1995 | Tisserand et al. ............... 156/252 |
| 5,486,254 | 1/1996 | Gallagher et al. ............... 156/494 |

FOREIGN PATENT DOCUMENTS

| | | |
|---|---|---|
| 0 576 371 A1 | 12/1993 | European Pat. Off. . |
| 62-287449 | 12/1987 | Japan . |
| 2 240 510 | 8/1991 | United Kingdom . |

*Primary Examiner*—Jan H. Silbaugh
*Assistant Examiner*—Kenneth M. Jones
*Attorney, Agent, or Firm*—Townsend and Townsend and Crew LLP

[57] ABSTRACT

A method to fabricate plastic cards is disclosed. A substrate tape is perforated with evenly spaced holes, and when placed in a working station, positioning pins engage into the holes. The spacing between two sets of pins is then slightly increased thereby tensioning the tape without stretching it thereby providing for highly accurate alignment.

6 Claims, 1 Drawing Sheet

METHOD FOR FABRICATING PLASTIC CARDS

BACKGROUND OF THE INVENTION

The present invention relates to a method for fabricating plastic cards from a plastic substrate tape which may be wound up to form a coil.

To fabricate credit cards, cheque cards, memory cards, ID>cards and the like such a substrate tape is stepwisely moved a series of working stations. In order to maintain the required extremely narrow tolerances, in particular in various printing stations, it is of utmost importance to have the portion of the substrate tape which is worked upon accurately aligned in each station.

It is common practice to provide the substrate tape with marks which are optically read in each working station; this technique was adopted from other types of printing methods.

It is an object or the present invention to improve the alignment accuracy.

BRIEF SUMMARY OF THE INVENTION

Briefly, the invention provides a plastic substrate tape having a width exceeding that which is used for the cards to be punched therefrom. Thus, along both edges of the tape there are margin strips. The strips are perforated with holes of uniform distance from one another. Each working station is provided with two sets of pins adapted to engage into corresponding sets of holes of the tape thereby aligning the tape portion between the two sets with the work station.

When the tape is passed across the working stations it must be lifted from the pins, moved through one card length, and then again placed with its holes on the pins. For proper alignment, the holes should snugly fit over the pins. For easy lifting, there should be clearance between holes and pins. In order to meet both requirements, the invention proposes to dimension the pins relative to the holes such that there is a loose fit upon placing the tape on the pins and upon lifting it therefrom. However, in order to properly align the tape in the working station, once it has been placed on the pins, the distance between the upstream pin set and the downstream pin set (i.e. the pin sets before and behind the working station or stations) is slightly increased by an amount such that the pins snugly engage the hole walls opposite the working station. The tape having been worked on, the original pin set distance is restored prior to lifting the tape therefrom. Thus, whenever the tape is moved relative to the pins, there is enough clearance to easily handle the tape and to avoid damages adjacent the holes.

It is to be noted that in many printing devices there are pins in engagement with holes in e.g. a paper web so as to transport the web through the device by movement of the pin carrier; see for example OFFSETPRAXIS 2/79, pages 22 to 33. Of course, the web is somewhat aligned by the pins but with a poor accuracy.

BRIEF DESCRIPTION OF THE DRAWING

The attached drawing illustrates schematically an implementation of the invention and shows a plan view of part of a card manufacturing plant.

DETAILED DESCRIPTION OF THE INVENTION

Figure 1:
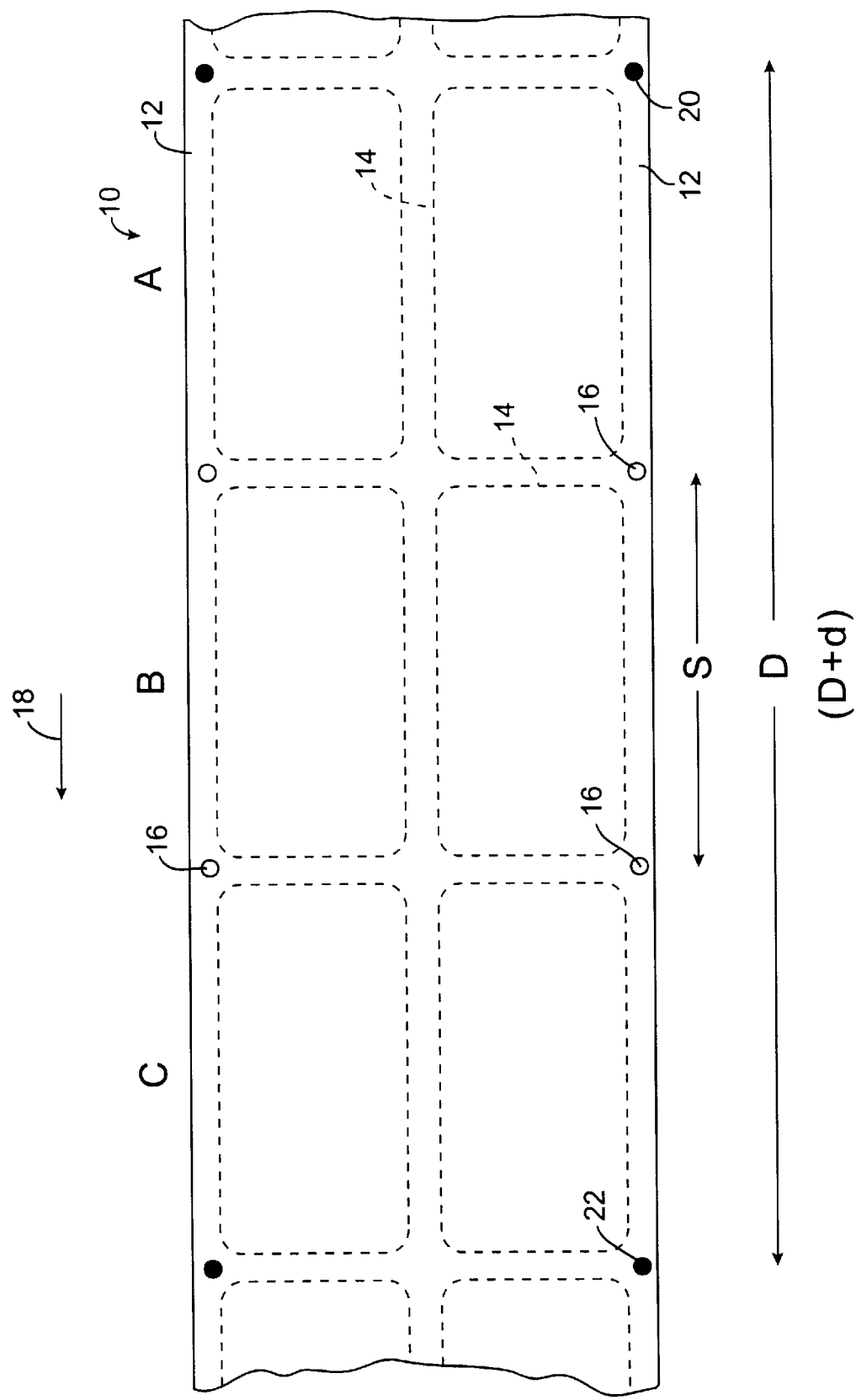

A plastic substrate tape 10 has lateral margin strips 12. The area between the strips 12 is used to produce cards 14 whose contour is indicated in broken lines. Perforations or holes 16 are provided in the margin strips between adjacent (to-be-fabricated) cards 14. The holes are punched such that their contour—which in the illustrated example is circular—is highly reproducible. Holes opposite to one another across the width of the tape form a "set". The longitudinal spacing "s" between adjacent sets of holes is extremely accurately reproduced.

The tape is moved across three working stations A, D, C in steps from station to station. Movement is in direction of arrow 18 so that the righthand tape portion in the drawing is "upstream", the lefthand portion is "downstream". In front of the working stations a first or upstream set of pins 20 engage into the holes aligned with them when the tape is lowered thereon. A second or downstream set of pins 22 engage similarly into a downstream hole set. As the diameter difference between the pins and the holes is so small that it cannot be shown in the drawing, the pin sets are indicated by filling the respective holes with black.

This distance spacing the upstream and downstream pins may be varied by mechanical means, not shown, between a first, smaller distance "D" for placing and lifting the holes on and from the pins, respectively, and a second, greater distance "D+d" during the working operation. It is to be noted that the distance D spans a plurality of working stations so that the amount by which the pin distance is to be increased may more easily be determined.

It has been found suitable to elastically stretch the tape when it is placed on the pins. For this purpose, the tape is gripped simultaneously by an upstream clamp and a downstream clamp (not shown) which do not engage the holes but simply clamp a portion of the tape when it is to be moved by one step. However, the downstream clamp moves through a slightly greater stroke than the upstream clamp without, of course, causing plastic deformation of the tape.

We claim:

1. A method for fabricating plastic cards, comprising the steps of:

providing a plastic substrate tape having lateral margin strips;

perforating said substrate tape within said margin strips thereby forming uniformly spaced holes in said margin strips of said substrate tape, providing at least one working station through which said substrate tape is stepwisely moved from an upstream side to a downstream side, providing an upstream set of pins and a downstream set of pins, said pins being adapted to engage into upstream holes and downstream holes, respectively, of said holes in said substrate tape when said substrate tape is on said at least one working station, providing means for stepwise displacement of said substrate tape across said at least one working station from the upstream side to the downstream side, displacing said substrate tape across said at least one working station using said means for stepwise displacement and lowering said substrate tape onto said pins and engaging said sets of pins into said upstream and downstream holes, increasing the distance between said upstream set of pins and said downstream set of pins by a predetermined amount such that the pins snugly engage walls of the holes, thereby aligning said substrate tape in said working station, then processing said substrate tape in said working station, then decreasing said distance spacing by said predetermined amount, and then lifting said substrate tape from said upstream set of pins and said downstream set of pins.

2. The method of claim 1 including the further step of elastically stretching said substrate tape prior to its placing onto said working station.

3. The method of claim 2 wherein a substrate tape portion between said upstream holes and said downstream holes extends across a plurality of working stations.

4. A method for fabricating plastic cards, comprising the steps of:

providing a plastic substrate tape having lateral margin strips;

perforating said substrate tape within said margin strips thereby forming uniformly spaced holes in said margin strips of said substrates tape, providing at least one working station through which said substrate is stepwisely moved from an upstream side to a downstream side, providing an upstream set of pins and a downstream set of pins, said pins being adapted to engage into upstream holes and downstream holes, respectively, of said holes in said substrate tape when said substrate tape is on said at least one working station, providing means for stepwise displacement of said substrate tape across the at least one working station from the upstream side to the downstream side, displacing said substrate tape across said working station using said means for stepwise displacement and lowering said substrate tape onto said pins and engaging said sets of pins into said upstream and downstream holes, increasing the distance between said upstream pin set and said downstream pin set by a predetermined amount so as to provide a snug fit to said pins in said holes and align said substrate on said at least one working station, then processing said substrate tape in said working station, then decreasing said distance spacing by said predetermined amount, and then using said means for stepwise displacement of said substrate tape to lift said substrate tape from said upstream pin set and said downstream pin set.

5. The method of claim 4 including the further step of elastically stretching said substrate tape prior to its placing onto said working station.

6. The method of claim 5 wherein a substrate tape portion between said upstream holes and said downstream holes extends across a plurality of working stations.

* * * * *